(12) United States Patent
Morrison et al.

(10) Patent No.: US 9,268,792 B2
(45) Date of Patent: Feb. 23, 2016

(54) AUTOMATIC SELECTION OF DIGITAL IMAGES WITH AN APPARATUS

(75) Inventors: Andrew Morrison, Bellevue, WA (US); Chris Park, Seattle, WA (US); Kevin Lau, Issaquah, WA (US); Parthu Kishen, Renton, WA (US); Desmond Smith, Seattle, WA (US); Michael Bibik, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 264 days.

(21) Appl. No.: 13/041,361

(22) Filed: Mar. 5, 2011

(65) Prior Publication Data

US 2012/0188405 A1 Jul. 26, 2012

Related U.S. Application Data

(60) Provisional application No. 61/435,757, filed on Jan. 24, 2011.

(51) Int. Cl.
*H04N 5/76* (2006.01)
*G06F 17/30* (2006.01)

(52) U.S. Cl.
CPC .... *G06F 17/30247* (2013.01); *G06F 17/30265* (2013.01)

(58) Field of Classification Search
CPC ............ G06F 17/30265; G06F 17/30247; G06F 17/30244; G06F 17/3053; G06F 17/30781; G06K 9/00536; G06K 9/623; G06T 2207/30168
USPC ........ 348/231.2, 231.3, 231.5, 231.6, 231.99; 707/722, 723, 732–734, 736, 737
See application file for complete search history.

(56) References Cited

U.S. PATENT DOCUMENTS

| | | | |
|---|---|---|---|
| 7,003,515 B1 * | 2/2006 | Glaser et al. | 707/723 |
| 7,467,222 B2 | 12/2008 | Kacker | |
| 7,779,117 B2 | 8/2010 | Tessman et al. | |
| 8,589,367 B2 * | 11/2013 | Sighart et al. | 707/705 |
| 8,676,803 B1 | 3/2014 | Leung et al. | |
| 2003/0187844 A1 * | 10/2003 | Li et al. | 707/7 |
| 2004/0025180 A1 | 2/2004 | Begeja et al. | |
| 2006/0203261 A1 * | 9/2006 | Kacker | 358/1.6 |
| 2008/0141307 A1 | 6/2008 | Whitehead | |
| 2009/0254539 A1 * | 10/2009 | Wen et al. | 707/5 |
| 2009/0292732 A1 * | 11/2009 | Manolescu | 707/104.1 |
| 2010/0125568 A1 | 5/2010 | van Zwol et al. | |
| 2010/0131500 A1 | 5/2010 | van Leuken et al. | |
| 2011/0182482 A1 | 7/2011 | Winters et al. | |
| 2012/0158717 A1 | 6/2012 | Unay et al. | |
| 2012/0188382 A1 | 7/2012 | Morrison et al. | |

(Continued)

OTHER PUBLICATIONS

U.S. Appl. No. 13/041,372—Non Final Office Action Mailed Sep. 27, 2012, 8 pages.

(Continued)

*Primary Examiner* — Nhan T Tran
*Assistant Examiner* — Chriss Yoder, III

(57) ABSTRACT

Described herein are techniques related to automatic selection of a group of one or more digital images from a set of digital images based, at least in part, upon weighted criteria regarding properties (e.g., metadata or content) of the digital images. This Abstract is submitted with the understanding that it will not be used to interpret or limit the scope or meaning of the claims.

19 Claims, 5 Drawing Sheets

(56) References Cited

U.S. PATENT DOCUMENTS

2012/0189284 A1  7/2012  Morrison et al.
2012/0191709 A1  7/2012  Morrison et al.

OTHER PUBLICATIONS

U.S. Appl. No. 13/041,372—Final Office Action Mailed May 22, 2013, 11 pages.
U.S. Appl. No. 13/041,372—Advisory Action Mailed Nov. 7, 2013, 3 pages.
U.S. Appl. No. 13/041,372—Non Final Office Action Mailed May 14, 2014, 12 pages.
U.S. Appl. No. 13/041,372—Notice of Allowance Mailed Feb. 27, 2015, 10 pages.
U.S. Appl. No. 13/041,369—Non Final Office Action Mailed Aug. 28, 2013, 10 pages.
U.S. Appl. No. 13/041,369—Final Office Action Mailed May 6, 2014, 10 pages.
U.S. Appl. No. 13/041,369—Non Final Office Action Mailed Dec. 2, 2014, 10 pages.
U.S. Appl. No. 13/041,369—Notice of Allowance Mailed Jun. 18, 2015, 5 pages.
U.S. Appl. No. 13/041,370—Non Final Office Action Mailed Oct. 24, 2012, 12 pages.
U.S. Appl. No. 13/041,370—Final Office Action Mailed Jul. 17, 2013, 14 pages.
U.S. Appl. No. 13/041,370—Pre-Brief Appeal Conference Decision Mailed Mar. 4, 2014, 2 pages.
U.S. Appl. No. 13/041,370—Notice of Abandonment Mailed Sep. 9, 2014, 2 pages.

* cited by examiner

AUTOMATIC SELECTION OF DIGITAL IMAGES WITH AN APPARATUS

RELATED APPLICATIONS

This application claims the benefit of priority to U.S. Provisional Patent Application Ser. No. 61/435,757, filed on Jan. 24, 2011, the disclosure of which is incorporated by reference herein.

BACKGROUND

With the widespread use of digital consumer electronic image-capturing devices such as digital cameras and camera/video phones, the size of consumers' digital image collections continue to increase very rapidly. As such collections grow ever larger and increasingly more unwieldy, a person is less able to handle the sheer volume of images in these collections.

A user may capture hundreds or thousands (or more) of digital photographs and videos over the course of time using image-capturing and multiuse devices. The task of organizing captured photographs often falls to the user of the device. Some conventional approaches provide a crude user interface that allows a user to sift through photographs using a timeline. Other conventional approaches allow a person to manually tag and organize photographs into virtual albums.

Software applications that manage media (e.g., digital photographs and videos) collections have become widely adopted as the amount of digital media, including images, has grown. Because of its large display, processing power, and memory capacity, most of these conventional approaches are concentrated on use with personal "desktop" computers. Using the ample room of the desktop computer's large displays, the desktop user interface offers a broad workspace for a user to view and manage a large catalogue of digital photographs.

As evidenced by seeming ubiquity of mobile personal communication devices (e.g., the so-called "smartphones"), mobile communication and computing technology has rapidly developed. With the processing power and memory capacity of such mobile technology, it is possible to have large media collections on mobile personal communication devices or have access to such collections via high-speed data telecommunication networks.

While the power and memory capacities have increased, a typical mobile personal communication device still has a small display and, consequently, a more constrained user interface capabilities than a desktop computer. Accordingly, a user of a typical mobile personal communication device is forced to abandon his mobile environment and move to a desktop computer in order to view and manage her large media catalogue.

SUMMARY

Described herein are techniques related to automatic selection of one or more digital images from a set of digital images based, at least in part, upon weighted criteria. Rather than manually sifting through a large collection of digital images to find the "best" ones, an image-capturing device may automatically select the "best" digital images based upon various weighted criteria regarding properties (e.g., metadata or content) of the digital images. The device presents the auto-selected "best" photos to the user. Based upon the user's reaction to the auto-selected photos, the image-capturing device may form a new group of "best" digital images based upon one or more reweighted criteria.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components

DETAILED DESCRIPTION

Figure 1:
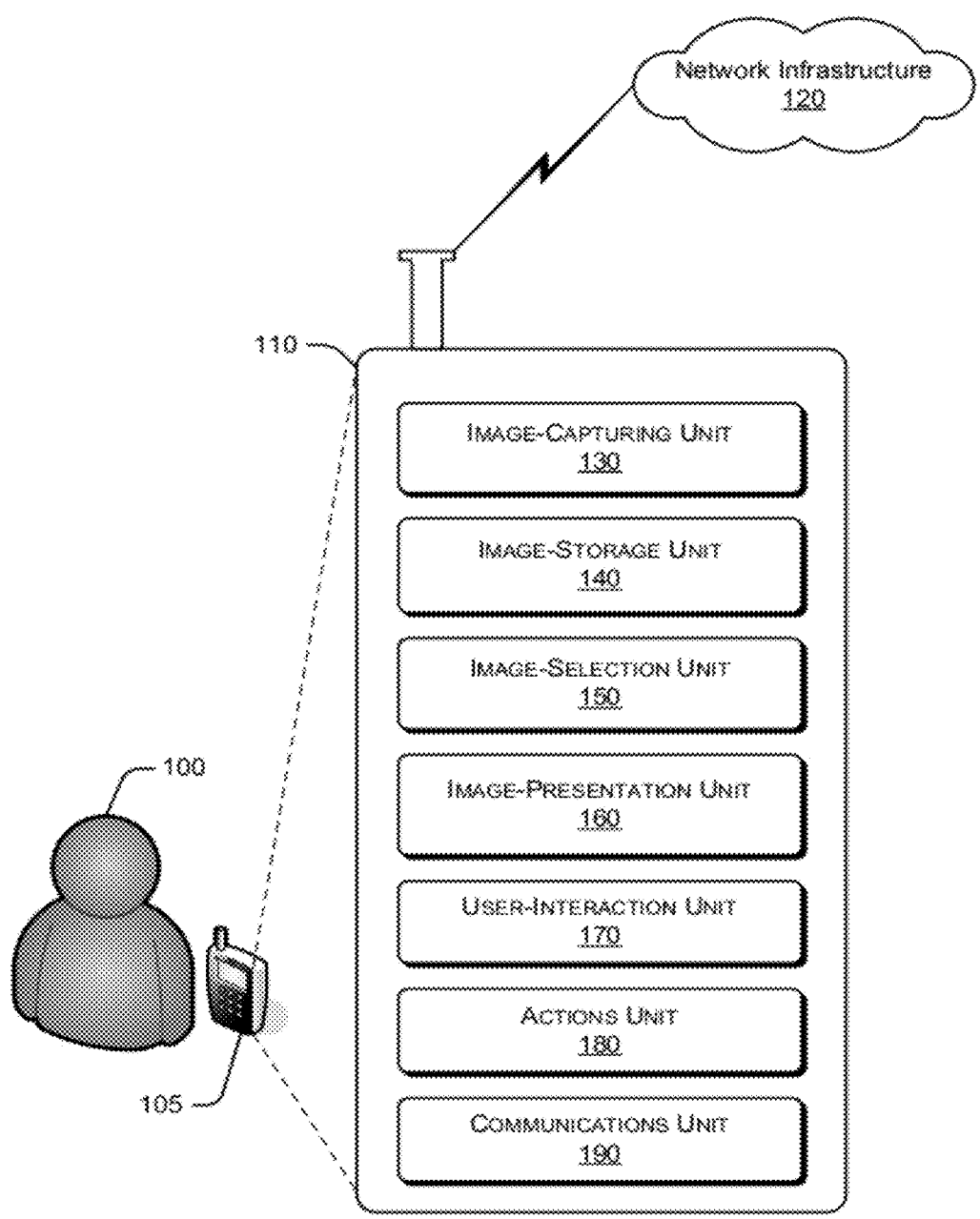
FIG. 1 illustrates image-capturing telecommunications apparatus that is configured to implement the techniques described herein for automatic selection of one or more digital images from a set of digital images based, at least in part, upon weighted criteria.

Described herein are techniques related to automatic selection of one or more digital images from a set of digital images based, at least in part, upon weighted criteria. Using an image-capturing device (such as a digital camera or a camera-equipped mobile phone), a person accumulates a large collection of digital images by, for example, taking several photographs over several days, weeks, or even months. Rather than manually sifting through the large collection to find her "best" digital images ("photos" herein), her image-capturing device automatically selects the "best" photos based upon various weighted criteria regarding properties (e.g., metadata or content) of the photos. The device presents the auto-selected "best" photos to the user.

Via a user-interface on the device, the user indicates whether she likes the photos auto-selected to be the "best" photos. If so, the weight values assigned to the various weighted criteria remain unchanged because those values seem to lead to a proper selection of photos. If the user disagrees with the selection, then the weight values are adjusted and the auto-selection is performed again but with reweighted values for the criteria.

For instance, consider the following scenario to illustrate how the techniques described herein may be employed. Using her camera-equipped smartphone, Isabel takes about twenty-five hundred photos during a summer vacation at Yellowstone and the Grand Tetons National Parks. As some point during her vacation, Isabel notices a notification on her phone asking her if she would like to look at her "best" photos. Curious, she, of course, looks through the top-rated two-percent (i.e., about fifty) of the photos that the smartphone has auto-selected as the "best" of the photos that she shot on her vacation.

While generally happy with the auto-selection, Isabel is displeased that so few of the photos include her family members in the photos. So, when asked, she indicates that she does not agree that these photos are the "best" in her subjective opinion. Isabel may indicate her displeasure by indicating that one or more particular photos do not belong amongst the "best" photos by removing them from the "best" group.

In response to her dissatisfaction, the smartphone quickly offers another auto-selection of fifty photos. The photos that she was displeased with (e.g., removed from the "best" group) are not part of the new offering of "best" photos. Since this offering seems to include many more of her family members in the photos, she agrees that these photos are the "best."

In response to her agreement and without any additional prompting from her, Isabel's contacts in her "favorites" list (which includes many friends and family members) receive a notification (via email, Short Message Service (SMS), social networking service, photo/video sharing service, etc.) about Isabel's new pictures for them to see. So, with little effort from Isabel, the fifty best photos out of about twenty-five hundred are shared with so many of the people who are most important to her. These photos are shared in a timely manner rather than weeks after her vacation and after manually sifting through her photos.

An example of an embodiment of an image-capturing apparatus that employs the new digital image auto-selection techniques described herein may be referred to as an "exemplary image-capturing device." While one or more example embodiments are described herein, the reader should understand that the claimed invention may be practiced using different details than the exemplary ones described herein.

The following co-owned U.S. Patent Applications are incorporated by reference herein:

U.S. Provisional Patent Application Ser. No. 61/435,757, filed on Jan. 24, 2011;

U.S. patent application Ser. No. 13/041,369, titled "Automatic Selection Of Digital Images From a Multi-Sourced Collection," filed on Mar. 5, 2011; and U.S. patent application Ser. No. 13/041,370, titled "Automatic Highlight Reel Producer," filed on Mar. 5, 2011;

U.S. patent application Ser. No. 13/041,372, titled "Automatic Sharing of Superlative Digital Images," filed on Mar. 5, 2011.

Exemplary Image-Capturing Device

FIG. 1 shows a user 100 (such as Isabel) holding a smartphone 105, which is shown in an expanded view as an exemplary image-capturing device 110. The device 110 may be used to automatically select a small group of digital images from amongst a large collection of such images captured by the device.

The device 110 has the capability to communicate (via cellular technology, Wi-Fi™, etc.) with a network infrastructure 120. This network infrastructure 120 may be a private or public network of computing or telecommunication resources. It may include the Internet. It may include the so-called "cloud." As such, the network infrastructure 120 may be called the cloud-computing infrastructure.

The image-capturing device 110 includes an image-capturing unit 130, an image-storage unit 140, an image-selection unit 150, an image-presentation unit 160, a user-interaction unit 170, an actions unit 180, and a communications unit 190. Each of these units may be implemented (at least in part) by a set of processor-executable instructions (e.g., software modules). Furthermore, each of these units may include or employ one or more lower-level components of the device 110. For example, these lower-level components include processors, memory, storage, video display, user-input device (e.g., keyboard), transceiver, and the like. These and other lower-level components are described herein (e.g., as part of the description of FIG. 5).

The image-capturing unit 130 is configured, designed, and/or programmed to capture digital images. That is, a person using the device 110 may take photos using the image-capturing unit 130 of the device.

The image-capturing unit 130 includes various lower-level camera components for capturing still digital images (i.e., photographs or photos) and/or moving digital images with audio (i.e., digital video). The camera components may include (by way of example and not limitation): one or more digital sensor chips, lenses, display, view-finder, and the like. The image-capturing unit 130 may be implemented, at least in part, by a software module resident, at least in part, in the device's memory and executed by one or more processors of the device.

In addition, the image-capturing unit 130 may include, or have associated therewith, an image-handling software module (e.g., application) that may be used to enhance an amount of information recorded in the image file relating to the captured digital images. For example, the image-handling application may use information from other sources and/or applications to add data to the image files (e.g., JPEG (Joint Photographic Experts Group), TIFF (Tagged Image File Format), RAW, PNG (Portable Network Graphics), etc.) that the captured digital images are stored on the image-storage unit 140. This added data may be called "metadata." Specifically, the image-handling application may be configured to obtain information from other hardware, firmware, or software components to add data to the image files. Examples of other components include (but are not limited to) a location application, a calendar application, and/or a contacts application running.

Additionally, the image-handling application may be designed to enhance user functionality once images have been obtained. For example, the image-handling application may also be configured to display images to the user in cooperation with or as part of the image-presentation unit 160. The image-handling application may include various filters or criteria used to limit the number of images displayed to the user. As discussed below, these filters or criteria may be user selectable, may use the data in the image file obtained from non-image sources or applications, may be configured based on data in the image files, etc. As another example, similar filters or criteria may also be used to cluster images into folders (such as virtual albums, system file folders, etc.). As still another example, the image-handling application may use data stored in the image files, contact information, calendar information, and/or upload information to increase the ease of sharing images.

The images operated on by the image-handling application may include images captured by the image-capturing unit 130, and/or may include images obtained from sources other than the image-capturing unit 130. For example, images may be transferred to device 110 using one or more wireless and/or wireline interfaces from the network 120.

The image-handling application may be limited to a particular type of digital image (e.g. still images (photographs), moving images (video), etc.) or may be configured to handle multiple types of images. In addition, the image-handling application may be a stand-alone application, or may be integrated into other applications or other units. Moreover, the image-handling application may be formed by a combination of functions of separate, distinct programs or units of the device 110.

The image-storage unit 140 is configured, designed, and/or programmed to store digital images and possibly other forms of data and software. That is, the device 110 stores the photos taken by the person using the device 110 on the image-storage unit 140 of the device.

The image-storage unit 140 includes one or more lower-level memory or storage components for storing still digital images (i.e., photographs or photos) and/or moving digital images with audio (i.e., digital video). The memory or storage components may be volatile or non-volatile, dynamic or static, read/write-able or read only, random- or sequential-access, location- or file-addressable, and the like. The memory or storage components may be magnetic, optical, holographic, and the like. The memory or storage components may be internal to the device 110, attached externally to the device 110, or available via data communications (e.g., on the network).

The images stored by the image-storage unit 140 may include images captured by the image-capturing unit 130, and/or may include images obtained from sources other than the image-capturing unit 130. For example, images may be transferred to the device 110 using one or more wireless and/or wireline interfaces from the network 120.

The image-selection unit 150 is configured, designed, and/or programmed to automatically select a group of top-ranked (or alternatively bottom-ranked) photos of a collection of such photos stored by the image-storage unit 140. Alternatively, the image-selection unit 150 may cluster the collection of photos before the auto-selection is performed. Alternatively still, the image-selection unit 150 may cluster the auto-selected group of photos after the auto-selection is performed.

The image-selection unit 150 shown in FIG. 1 is implemented as a software module which would reside, at least in part, in the device's memory and be executed by the device's one or more processors. Alternatively, the image-selection unit 150 may be implemented as a collection of or as part of dedicated hardware or firmware. Alternatively still, the image-selection unit 150 may be implemented as a combination of hardware, firmware, or software.

The image-presentation unit 160 is configured, designed, and/or programmed to visually present digital images to the user for her consideration. That is, a person using the device 110 may view a selection of photos using the image-presentation unit 160 of the device.

The image-presentation unit 160 includes various lower-level audio/visual presentation components for showing still digital images (i.e., photographs or photos) and/or moving digital images with audio (i.e., digital video). The audio/visual components may include (by way of example and not limitation): a liquid crystal display (LCD), a flat panel, organic light-emitting diode (OLED) displays, pico-projection displays, a solid state display or other visual display device, speakers, and the like. The image-presentation unit 160 may be implemented, at least in part, by a software module resident, at least in part, in the device's memory and executed by one or more processors of the device.

The user-interaction unit 170 is configured, designed, and/or programmed to attain feedback (e.g., obtain input) from the user and, in particular, feedback related to the photos presented in cooperation with the image-presentation unit 160. That is, a person using the device 110 indicates approval of or disapproval with the auto-selected group of photos presented on-screen by using the user-interaction unit 170 of the device.

The user-interaction unit 170 includes various lower-level user-input components for receiving input from the user, such as (by way of example and not limitation): keyboard, touchscreen, touchpad, trackball, and the like. The user-interaction unit 170 may use some of the same audio/visual components of the image-presentation unit 160. The user-interaction unit 170 is implemented as a software module which would reside, at least in part, in the device's memory and be executed by the device's one or more processors. Alternatively, the image-selection unit 150 may be implemented as a collection of or as part of dedicated hardware or firmware. Alternatively still, the image-selection unit 150 may be implemented as a combination of hardware, firmware, or software.

The actions unit 180 is configured, designed, and/or programmed to automatically perform a defined action on each photo in a group of top-ranked (or alternatively bottom-ranked) photos of a collection of such photos stored by the image-storage unit 140. Presuming the photos are top-ranked, the defined actions include (by way of example and not limitation): archiving, sharing, printing, conversion/reformat, and the like. Presuming the photos are bottom-ranked, the defined actions include (by way of example and not limitation): deleting, recycling, and the like.

Archiving photos involves storing photos in a different and perhaps more reliable location, such as onto the cloud-computing infrastructure. Sharing photos includes sending copies of the photos to another person via one or more various ways of sending such data or notices of the same. Alternatively, sharing photos includes sending a link to one or more of the photos via one or more various ways of sending such links or notices of the same. Examples of such ways to send photos, links, and/or notices thereof include (but are not limited to): email, posting on a social network, posting on a blog or website, text message, MMS (multimedia messaging service), and the like. Printing photos is much like sharing photos, but the destination is a printer capable of printing the shared photos. Also, the photos may be automatically converted or reformatted in a pre-defined manner.

Deleting photos involves permanently removing the photo from the image-storage unit 140. Recycling photos involves placing the photo into a queue of files to be deleted later. This queue is sometimes called the "trash" or "recycle bin."

The actions unit 180 shown in FIG. 1 is implemented as a software module which would reside, at least in part, in the device's memory and be executed by the device's one or more processors. Alternatively, the actions unit 180 may be implemented as a collection of or as part of dedicated hardware or firmware. Alternatively still, the actions unit 180 may be implemented as a combination of hardware, firmware, or software.

The communications unit 190 is configured, designed, and/or programmed to transmit (and/or receive) notifications of, links to, and/or copies of digital photos through the network 120 and onto another user or device accessible from that network. For example, a user of the device 110 may have an auto-selected group of the photos that the person took sent to their friends upon the person's approval of that auto-selected group.

The communications unit 190 includes various lower-level communications components for sending and/or receiving data communications from/by the device. Using transceiver, transmitter, receiver, network interface controller (NIC), and the like, the communications unit 190 utilizes wired (e.g., universal serial bus (USB) or Ethernet) or wireless communications. Examples of wireless communications are (by way of example and not limitation): cellular, satellite, conventional analog AM or FM radio, Wi-Fi™, wireless local area network (WLAN or IEEE 802.11), WiMAX™, and other analog and digital wireless voice and data transmission technologies. The communications unit 190 may be implemented, at least in part, by a software module resident, at least in part, in the device's memory and executed by one or more processors of the device.

Exemplary Processes

Figure 2:
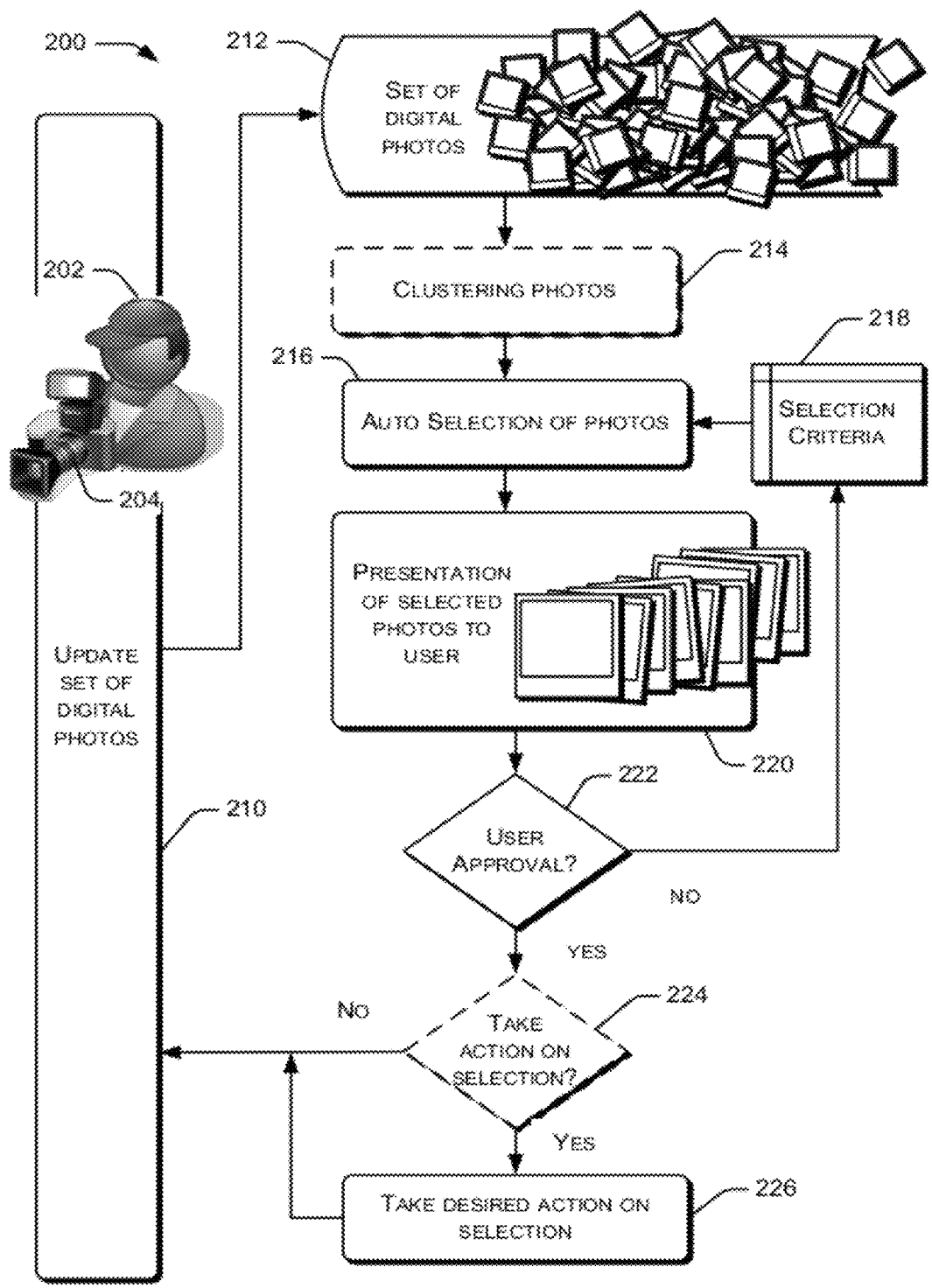
FIGS. 2-4 are flowcharts of processes that are configured to implement the techniques described herein for automatic selection of one or more digital images from a set of digital images based, at least in part, upon weighted criteria.
Figure 3:
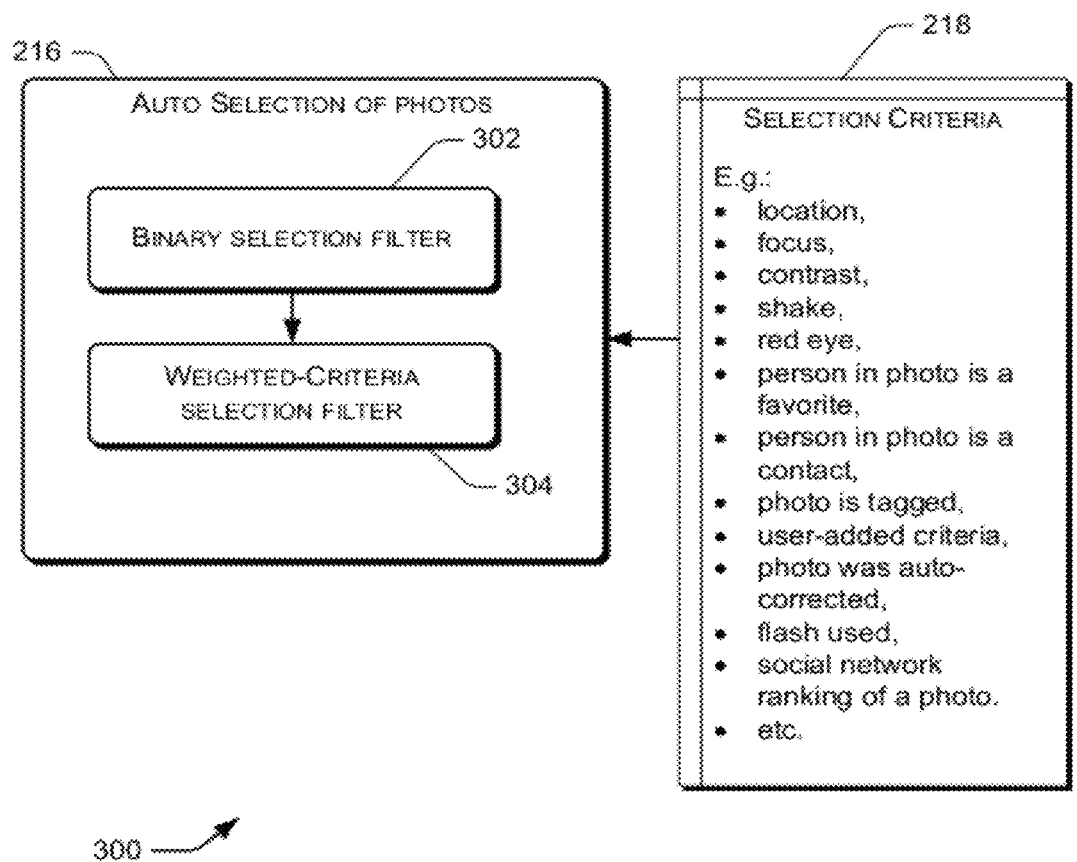
Figure 4:
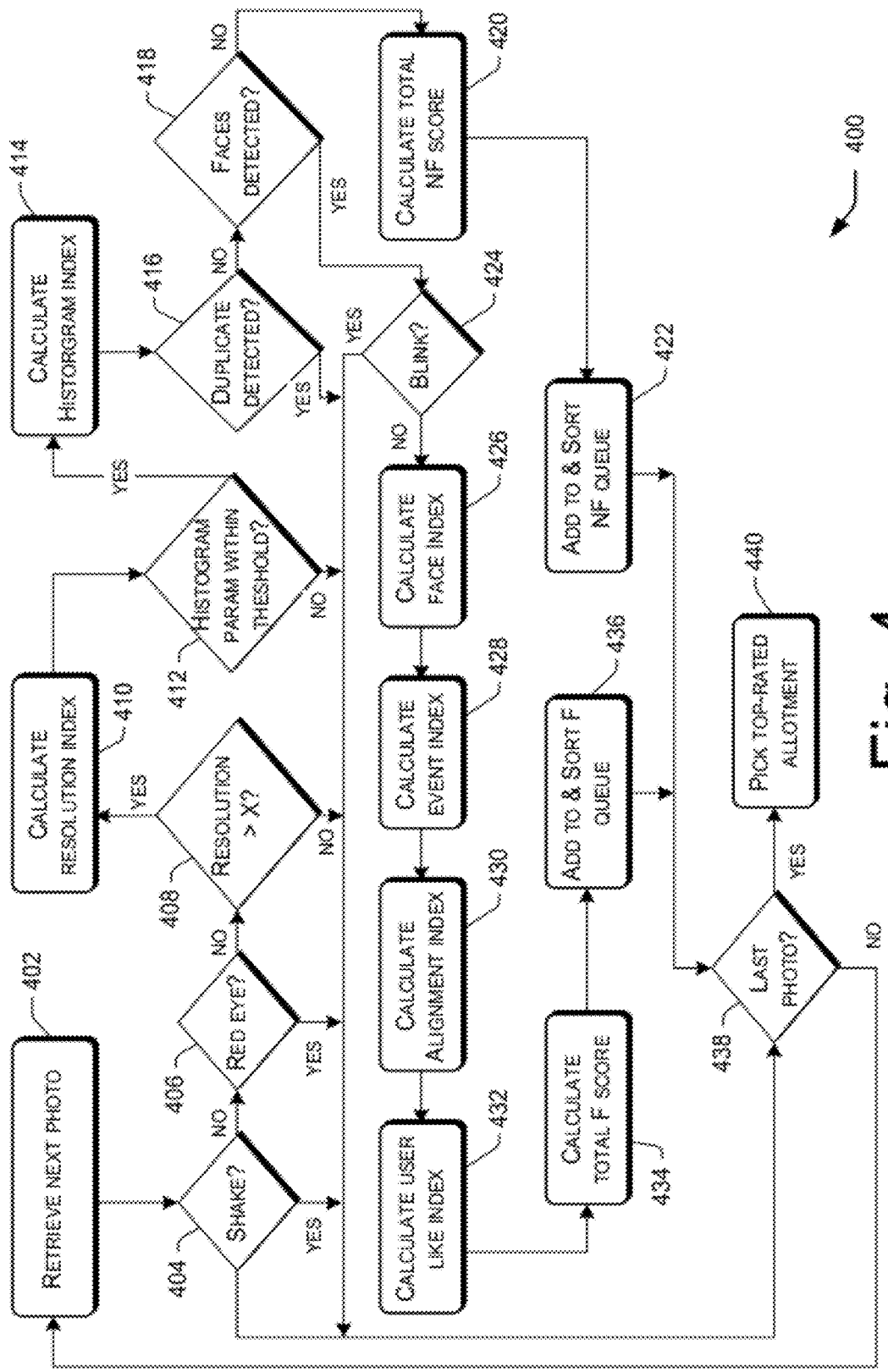

FIGS. 2-4 are flowcharts illustrating exemplary processes 200, 300, and 400 that implement the techniques described herein for automatic photo selection. The exemplary processes 200, 300, and 400 are performed, at least in part, by the image-capturing device, such as device 110 of FIG. 1, an image-capturing device 204 of FIG. 2, and/or an image-capturing telecommunications device 510 of FIG. 5.

The process 200 starts, at 210, with an update of a set 212 of digital images (i.e., photos) by, for example, a user 202 taking new photos with an image-capturing device 204, such as a digital camera. Of course, the set 212 of photos may be updated via other sources such as from a nearby Bluetooth™ device, via cellular connection, from the Internet (e.g., email, social networking site, website, etc.), or some cloud-computing infrastructure resource. The set 212 of digital images may be stored on the device 204, on another data-communicative device, on a network server, on the Internet, in the cloud, or some combination thereof. The box representing operations 210 is vertically long and horizontally narrow so as to indicate that this operation may occur while the other to-be-described operations are performed.

Next, at operation 214, the device 204 clusters photos of the photo set 212 based on one or more criteria, such as location, time, date, and calendar information from one or more events, such as those on private and/or publicly available calendars. Additionally, the clustering criteria may also consider event specifics, such as, faces in a series of images, colors associated with images, including overall brightness, color similarities or dissimilarities, and scene information. Clusters of images may be multilayered. For example, a cluster of wedding images may have a number of secondary clusters. One secondary cluster may include images of just the groom and bride, where another secondary cluster may include images of just the bridesmaids.

In FIG. 2, operation 214 is shown as a dashed box to indicate that it is optional and in some implementations may not include any clustering. In some other implementations, the clustering may occur after the auto-selection of the next operation (at 216). The clustering may occur before, after, or both before and after the auto-selection operation 216. The clustering criteria may include and overlap with a selection criteria 218.

After that, at 216, the device 204 auto-selects a subset of the set 212 of digital photos. As used herein, the subset presumptively includes some, but not all of, the digital images of the set 212. Alternatively, when the clustering operation 214 is performed, the device auto-selects a subset of one of the clusters or perhaps across multiple clusters.

Typically, the selected subset includes the superlative digital images from the set 212 of digital images. As used herein with regard to digital images, the term "superlative" refers to a subset of digital images having the highest kind, quality, or order with respect to the other digital images of a set. For example, digital images that are top-ranked, bottom-ranked, or ranked otherwise in some category or characteristic are superlative. Also, for example, digital images considered the "best" or "worst" of the set are considered superlative.

The auto-selection of operation 216 is based upon one or more weighted selection criteria 218 of one or more properties of the photos. FIG. 3 provides more information regarding both the auto-selection operation 216 and the selection criteria 218. The auto-selection operation 216 may be designed to find the "best" photos (i.e., the top-ranked photos) in the user's subjective opinion. Alternatively, it may be designed to find the "worst" photos (i.e., the bottom-ranked photos) in the user's subjective opinion.

At 220, the device 204 presents the auto-selected subset of photos to the user 202 via a user interface (of a telecommunication device or a tele-coupled computer device). Via the user-interface (including a user-input device), the user 202 indicates his approval of the auto-selected subset of photos. By approving, the user 202 may be, for example, agreeing that the auto-selected subset of photos represents the "best" photos in his subjective opinion. Conversely, by disapproving, the user 202 may be, for example, disagreeing that the auto-selected subset of photos represents the "best" photos in his subjective opinion.

At 222, the device 204 attains feedback from the user regarding the auto-selected subset of photos. The device determines whether the input from the user indicates approval of the auto-selected subset of photos. If not approved, then the device 204 updates (i.e., adjusts or alters) the weight values assigned to one or more of the selection criteria 218 and the process returns to the auto-selection operation 216 to perform a reweighted selection of the photos based upon the now updated criteria. The device 204 automatically reselects an updated subset of the set 212 of digital photos. Alternatively, when the clustering operation 214 is performed, the device automatically reselects an updated subset of one of the clusters or perhaps across multiple clusters. If the user input indicates, at 222, that the user disapproved, the process proceeds to operation 224.

In one or more implementations, the user 202 may indicate his disapproval by him choosing to remove or add one or more photos from/to the auto-selected subset. In the same implementation or others, the device 204 may "learn" the types of images that a user prefers or does not prefer based on iterations of approval and disapproval by the user. When a user removes a photo from the subset, the device 204 reduces the weight values for the removed photo's strong properties and/or increases the weight values for the removed photo's weak properties. And vice versa for the photos that the user manually adds to the subset. Using machine learning techniques, the multiple iterations hone the weight values assigned to various weighted selection criteria.

At 224, the device determines whether input from the user (most likely in addition to the user input regarding approval) indicates whether to take a defined action upon the subset of photos and/or which of several possible defined actions to take upon the subset. If the user does not want any defined action, then the process returns to the beginning operation at 210. If the user wants a defined action to be performed upon the subset, then the process proceeds to action operation at 226.

In FIG. 2, operation 224 is shown as a dashed box to indicate that it is optional and some implementations may not offer the user this choice. Alternatively, the device 204 may perform one or more defined actions by default. Alternatively still, the user may have pre-set whether and/or which one or more of the defined actions will be performed upon the auto-selected subset.

At 226, the device 204 performs one or more defined actions on the auto-selected subset of photos. Presuming the photos are top-ranked (i.e., "best"), the defined actions include (by way of example and not limitation): archiving, sharing, printing, converting/reformatting, and the like. Presuming the photos are bottom-ranked (i.e., "worst"), the defined actions include (by way of example and not limitation): deleting, recycling, and the like.

After the one or more actions are performed on the subset, the process returns to the photo-set updating operation 210. The operations 214 through 226 may be performed in real-time with the photo-set updating operation 210.

FIG. 3 shows the process 300 and offers more details regarding the auto-selection operation 216 and the selection criteria 218. The auto-selection operation 218 includes a binary selection filter operation 302 followed by a weighted-criteria selection filter operation 304. At 302, one of more of the criteria 210 may be applied as a binary filter to, for example, remove photos that do not meet the one or more criteria. After that, at 304, one or more of the criteria are applied in a weighted manner.

Generally, the main purpose of the binary selection filter operation 302 is to remove outright "bad" photos. So, it could be called the bad-photo filter. A bad photo is one where the content is difficult for a human to discern and simple post-processing is not likely to make the content discernable. The binary filter may use one or more criteria related to one or more properties that might make a photo be considered "bad." Examples of such "bad photo" criteria include (but are not limited to): shaky, blurry, over or under exposed, poor resolution, poor contrast, out-of-focus, red-eye, and the like. Red-eye might not be part of the binary selection filter operation 302 in some implementations because it can be removed with some post-processing.

Some implementations may not employ the binary selection filter operation 302. Those implementations may rely upon the weighted-criteria selection filter operation 304 to remove the "bad" photos.

Alternatively, the binary selection filter operation 302 may be described as grouping the set 212 of digital images into an intermediate grouping that includes two or more of the digital images of the set 212. Similarly, the weighted-criteria selection filter operation 304 may be alternatively described as ranking the digital images of the intermediate grouping based upon one or more of the multiple weighted criteria 218 and designating an allotment of top-ranked (or bottom-ranked) digital images of the intermediate grouping as the selected subset of digital images that results from the auto-selection operation 216.

The size (i.e., number, cardinality) of the allotment may be a fixed number (e.g., ten) or calculated. If fixed, the allotment size may be a factory-set default number or a user-defined number. If calculated, the calculation may be, for example, based upon linear or non-linear proportions of the quantity of photos in the set 212, in one or more clusters, in the intermediate grouping, and/or the like. These proportions may be factory-set or user-defined. A percentage is an example of such proportions.

For example, the allotment size for the subset may be user-defined to be five percent of the set 212 of photos. If, for this example, the set 212 included twelve-hundred sixty-two photos, then the allotment size would be sixty-two (with truncation). Consequently, the user 202 would be presented with sixty-two photos for his approval.

Typically, the criteria used for the binary filtering differ from those used for the weighted filtering. However, in some implementations, the criteria used for one may overlap the criteria used for the other. The criteria are related to properties of a photo. Those properties may be derived from the content of the photo (based upon an image analysis) and/or from metadata associated with the photo. Examples of photo metadata include (but are not limited to): technical metadata (such as size, resolution, color profile, ISO speed and other camera settings), descriptive metadata (captions, headlines, titles, keywords, location of capture, etc.), and administrative metadata (such as licensing or rights usage terms, specific restrictions on using an image, model releases, provenance information, such as the identity of the creator, and contact information for the rights holder or licensor).

The weighted selection criteria 218 include (by way of example and not limitation): location of image-capture, focus, contrast, shake, red eye, person in photo is a favorite (e.g., in a social network or on the device), person in photo is a contact, photo is tagged (in general or with a particular tag), user-added criteria, photo was auto-corrected, flash used, social network ranking of a photo, etc.

FIG. 4 illustrates the process 400 for determining a best photo that may be used with embodiments described herein. This process 400 may be employed as part of process 200 and/or process 300 herein.

The process 400 starts with operation 402 where the device retrieves the next photo (or the first when initially executed) from a memory like that of image-storage unit 140 of device 110. Next, at 404 and 406, a determination is made if the retrieved photo is shaky or if redeye is detected. If so, a next photo is retrieved and the process 400 starts again with that next image. If the retrieved photo is the last (as determined at operation 438), then the process 400 proceeds to a photo-ranking operation 440, which is discussed later.

If no shake or redeye is detected in a clip, then the process 400 continues onto operation 408 where it is determined if the resolution of the retrieved photo is greater than a defined threshold resolution. If not, then a next photo is retrieved and the process begins again. If so, based on the resolution of the image, a resolution index is determined or calculated at operation 410. In one example, the resolution index may be determined or calculated based on the resolution (megapixels) associated with a photo undergoing consideration. Next, at 412, the process determines if the histogram associated with the photo is within a defined threshold. If not, then a next photo is retrieved and the process begins again. If so, based on the histogram of the photo, a histogram index is determined or calculated at 414. In one example, the histogram index is determined or calculated based on a consideration of the number of "dark" pixels (underexposure), "bright" pixels (overexposure), and/or the number of pixels that fall between the underexposure and overexposure range.

Next, the process continues, at 416, to determine if a duplicate photo of the one currently being processed is stored in the device or otherwise known or available. If so, a next photo is retrieved and the process begins again. If not, the process determines, at 418, if one or more faces are detected in the photo. If no faces are detected in the photo, the process calculates, at 420, a NF ("no face") photo score based on the calculated resolution index and histogram index, and associates the NF score with the photo and adds the photo to a "no face" image queue at 422. If one or more faces is detected, the process determines, at 424, if a subject in the photo has their eyes shut or partially shut (i.e., "blink detection"). If a blink is detected, a next photo is retrieved and the process begins again.

If no blink is detected, the process calculates face, event, alignment and user like indexes at operations 426, 428, 430, 432, respectively. In one implementation, the face index calculation considers if one or more expected or desired faces are in a photo, the event index calculation considers if an expected event (e.g., wedding or party) is part of a photo, the alignment calculation considers a degree of alignment (e.g., vertical or horizontal) of a photo and the user like index considers a relative user acceptance or approval (e.g., like or dislike) of one or more faces in a photo. These indexes and the previously calculated indexes associated with resolution and histogram are considered when calculating an F ("face") photo score at 434. The face image score is associated with the photo and the photo is added to a face queue at 436.

Each time a photo is added to a queue, the queue is automatically resorted based on scores associated with an already processed and queued photo. Once the last photo is processed (as determined by operation 438), the process picks the highest scored photo as the best photo at 440. In addition, operation 440 may also select, based on photo score, an allotment of photos for presentation to a user of the portable device.

In alternative implementations, other criteria (like those of 218 in FIGS. 2 and 3) and/or different permutations of criteria may be employed at operations 404, 406, 408, 416, 418, and 424. For example, with operations 404, 406, and 408 other "bad photo" type criteria may be used and with operations 416, 418, and 424 other weighed selection criteria may be employed.

Exemplary Device within Exemplary Telecommunication Environment

Figure 5:
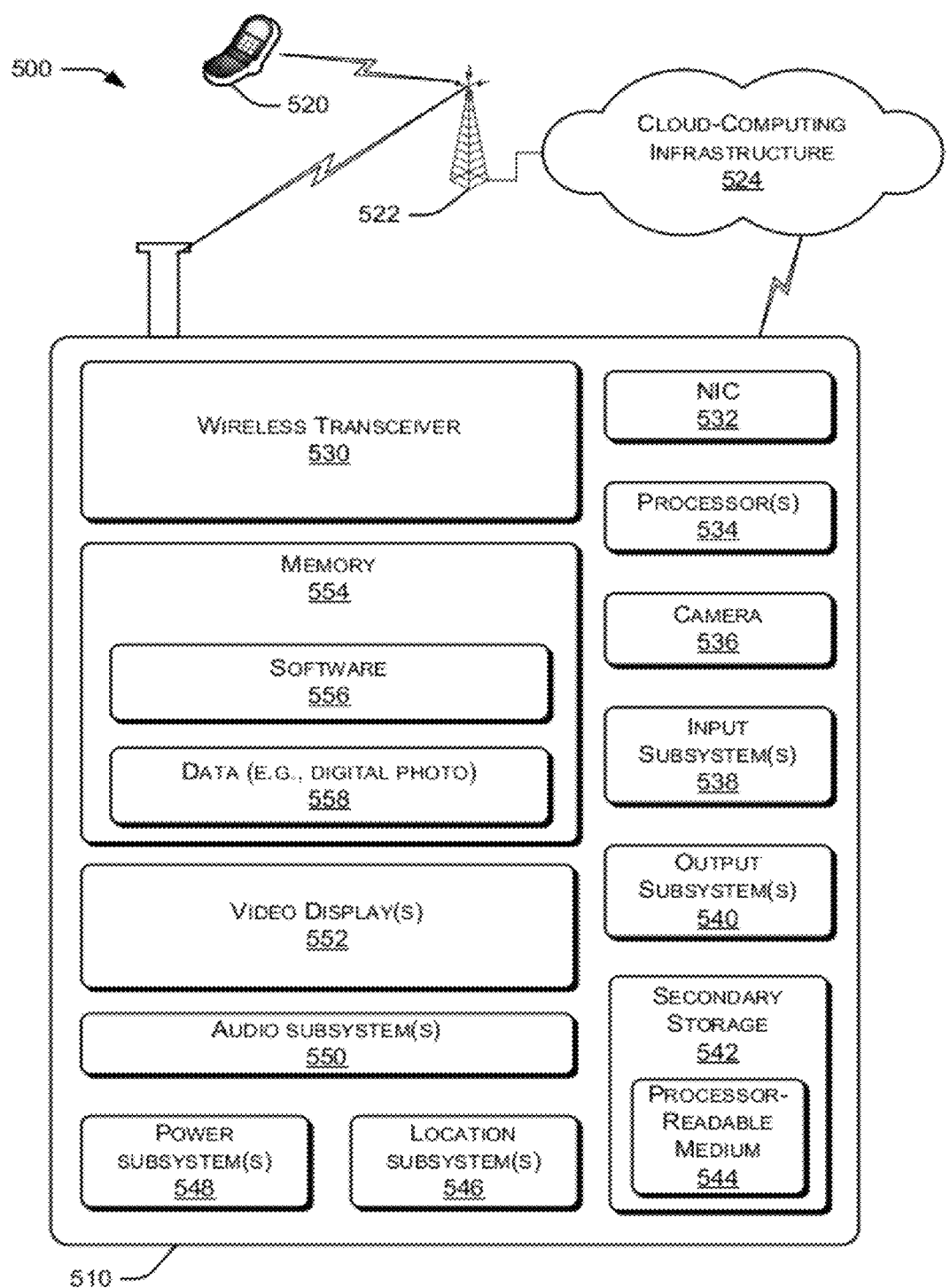
FIG. 5 depicts an image-capturing telecommunications apparatus within a telecommunications environment. The depicted apparatus is configured to implement the techniques described herein for automatic selection of one or more digital images from a set of digital images based, at least in part, upon weighted criteria.

FIG. 5 shows an exemplary telecommunication environment 500 which includes an image-capturing telecommunications device 510. Both the environment 500 and the device 510 may be included as part of one or more implementation of the techniques described herein.

As depicted, the device 510 is a smartphone that is capable of communicating using analog and/or digital wireless voice and/or data transmission. FIG. 5 shows the device 510 in communication with a cell phone 520 via a so-called cellular network 522 as represented by cell tower. Via that cellular network 522 or via some other wireless or wired communication technology (e.g., Wi-Fi™, WiMAX™, WLAN, Ethernet, etc.), the device 510 is coupled to a cloud-computing infrastructure 524.

The cloud-computing infrastructure 524 may include scalable and virtualized compute resources over a private or public network. Typically, a cloud-computing infrastructure uses the internet and central remote servers to maintain data and applications. The cloud-computing infrastructure 524 includes a group of individual computers connected by high-speed communications and some form of management software guiding the collective actions and usage of the individual computers. This technology allows for much more efficient computing by centralizing storage, memory, processing and bandwidth. While depicted in FIG. 5 as the cloud-computing infrastructure, item 524 may alternatively be viewed as a network or the Internet.

The device 510 includes many components, such as a wireless transceiver 530, a NIC (network interface controller) 532, one or more processors 534, one or more cameras 536, one or more input subsystems 538, one or more output subsystems 540, a secondary storage 542 with at least one processor-readable medium 544, one or more location subsystems 546, one or more power systems 548, one or more audio systems 550, one or more video displays 552, and a memory 554 having software 556 and data (e.g., digital photo or digital video) 558 stored thereon.

The NIC 532 is hardware component that connects the device 510 to one or more computer networks and allow for communication to and from that network. Typically, the NIC 532 operates as both an Open Systems Interconnection (OSI) layer 1 (i.e., physical layer) and layer 2 (i.e., data link layer) device, as it provides physical access to a networking medium and provides a low-level addressing system through the use of Media Access Control (MAC) addresses. It allows devices to connect to each other either by using cables or wirelessly.

The one or more processors 534 may include a single or multi-core central processing unit (CPU), a graphics processing unit (GPU), other processing unit or component, or some combination thereof.

The camera 536 may be configurable to capture still images (clips), moving images (video), or both still and moving images. The camera components may include (by way of example and not limitation): digital sensor chip (e.g., CCD (charge-coupled device) or CMOS (complementary metal-oxide-semiconductor)), lenses, flash, and the like.

The input subsystems 538 are physical devices designed to allow for input from, for example, a human user. The input subsystems 538 may include (by way of example and not limitation): keyboard, keypad, touchscreen, touchpad, mouse, trackball, paddle, light pen, scanner, stylus, and/or a micro-telecommunications device.

The output subsystems 540 are mechanisms for providing a tactile output to the user in a manner that is neither audio nor video based. Such tactile output is typically generated by an offset rotating motor that vibrates the device 510 to give a notification to the user.

The secondary storage 542 is typically a read-only memory (ROM), a programmable memory (such as EEPROM, EPROM, or PROM), a static read/writable memory (such as flash memory), and a mechanical read/writeable device (such as hard drive), which may be magnetic, optical, holographic, and the like. The components of the secondary storage 542 may be internal to the device 510, attached externally to the device 510, or available via data communications (e.g., on the cloud).

At least one processor-readable medium 544 is stored on the secondary storage 542. The processor-readable medium 544 stores one or more sets of instructions (e.g., software) embodying any one or more of the methodologies or functions described herein. The instructions may also reside, completely or at least partially, within the memory 554 as software 556 and within the processor(s) 534 during execution thereof by the device 510.

The location subsystems 546 may be designed to determine the physical location of the device 510. The one or more location subsystems 546 may include (but is not limited to) an application and hardware for determining location via global positioning system (GPS) and/or by communicating with a cellular network.

The power subsystems 548 may include (but is not limited to) one or more batteries and one or more external power supplies, such as an interface to an external power supply source.

The audio systems 550 are configured to generate sound, noise, voices, and music. In addition, the audio systems 550 are configured to capture and process sound, noise, voices, and music. The audio systems 550 includes (but is not limited to) speakers and microphones.

The video display 552 is configured to display images, videos, text, user-interfaces, and the like. The video display 552 may include (but is not limited to) a liquid crystal display (LCD), a flat panel, a solid state display or other device. The video display 552 may operate as a digital viewfinder that allows a user to preview a scene before capturing an image and/or to view a movie as it is being captured.

The memory 554 is configured to store software 556 and data (e.g., digital photo or digital video) 558 thereon. The memory 554 is a working space and may include (but is not limited to) random access memory (RAM). The memory 554 maybe one or more of the following (by way of example and not limitation): volatile or non-volatile, dynamic or static, read/write-able or read only, random- or sequential-access, location- or file-addressable, and the like. The components of the memory 554 may be internal to the device 510, attached externally to the device 510, or available via data communications (e.g., on the cloud).

Additional and Alternative Implementation Notes

The exemplary devices and apparatuses discussed herein that implement at least some aspect of the techniques discussed herein include (by way of illustration and not limitation): the image-capturing device 110 from FIG. 1, the image-capturing device 204 of FIG. 2, and the image-capturing telecommunications device 510 of FIG. 5.

Such exemplary devices may be what is commonly referred to as a "mobile phone," "smartphone," and/or "cellphone." However, the described techniques can be used in conjunction with non-cellular technologies such as conventional analog AM or FM radio, Wi-Fi™, wireless local area network (WLAN or IEEE 802.11), WiMAX™ (Worldwide Interoperability for Microwave Access), Bluetooth™, and other analog and digital wireless voice and data transmission technologies. Alternative implementations of such devices might not have any telecommunications or wireless communication capability. Still other alternative implementations may utilize a wired communication link instead of or in addition to wireless communication.

The exemplary devices are not limited to those having a camera. Any device with the capability to acquire, collect, and/or manipulate digital images may implement some aspect of the techniques discussed herein. Examples of such alternative devices include (but are not limited to) the following: tablet-based computer, other handheld computer, netbook, computer, digital camera, digital camcorder, handheld multimedia device, digital single-lens reflex (DSLR) camera, GPS navigational system, vehicle-based computer, or other portable electronics.

The exemplary devices may operate on digital images acquired from sources other than their own image-capturing components. These other images sources may be other image-capturing devices or from non-camera-equipped sources. The non-camera-equipped sources include other devices or services where images are stored, collected, accessed, handled, manipulated, and/or viewed. Examples of such alternative image sources include (but are not limited to): a photo-processing kiosk, portable and removable storage media or device (e.g., CD-ROM, DVD-ROM, other optical media, USB flash drive, flash memory card, external hard drive, etc.), electronics with radio-frequency identification (RFID), a social-networking services (e.g., Facebook™ MySpace™, Twitter™, Linkedin™, Ning™, and the like), and photo/video sharing services (e.g., Flickr™, Photobucket™, Picasa™, Shutterfly™, and the like).

One or more implementations of the techniques described herein may include an initial training session for the auto-selecting device or service to learn what makes a photo or video clip superlative (e.g., best or worst) in the user's opinion. This training may be repeated from time to time. This training will set the weight values of one or more of the weighted criteria. There may be various profiles for specific conditions and situations where the weighted criteria have their own trained values. Each user of an auto-selecting device or service may have their own customized weighted criteria values and profiles of such values. An auto-selecting device or service may have a default set of values or profiles assigned. That default set or profiles may be extrapolated from a statistically evaluation (e.g., mean or median) of the trained values derived from multiple users.

Instead of a training session, one or more implementations may take advantage of a system of user-ratings (e.g., thumbs up/down or 1 to 5 stars) for photos and/or video clips. These user-rating are effective data for training the exemplary video-capture device to learn what makes a photo and/or video clip superlative (e.g., best or worst) in the user's opinion. In some implementations, the user may define values for one or more of the weighted criteria. This may be accomplished using, for example, slider-bar user interface for the user to adjust weights assigned to particular criteria or to categories of criteria.

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein are illustrated as a collection of blocks in a logical flow graph, which represents a sequence of operations that can be implemented with hardware, software, firmware, or some combination thereof. In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

What is claimed is:

1. An image-capturing apparatus comprising:
   an image-capturing unit configured to capture digital images;
   an image-storage unit configured to store captured digital images;
   an image-selection unit configured to select a subset of digital images of a set of stored images, wherein the selected subset of digital images includes a group of digital images that are selected in accordance with a binary selection filter and subsequently ranked according to a weighted selection criteria, the binary selection filter to select a pre-subset of digital images to be operated on by the weighted selection criteria to determine the selected subset of digital images;
   an image-presentation unit configured to present the selected subset of digital images to a user of the image-capturing apparatus; and
   a user-interaction unit configured to attain feedback from the user regarding user-acceptability of the selected subset of digital images presented to the user via the image-presentation unit, the attained feedback being a user initiated removal of a digital image from the selected subset of digital images; and
   wherein the image-selection unit is further configured to perform, in response to attained user-feedback indicating a lack of user-acceptability of the selected subset of digital images, a reweighted selection of at least one updated subset of digital images of the set, the reweighted selection including using at least one or more update of the weighted selection criteria, the at least one or more update of the weighted selection criteria having at least one updated weight value compared to at least one weight value associated with the weighted selection criteria, the at least one update weight value established based on the user initiated removal of a digital image from the selected subset of digital images.

2. An image-capturing apparatus as recited in claim 1, wherein the image-selection unit is further configured to perform, in response to attained user-feedback indicating user-acceptability of the selected subset of digital images, one or more defined actions upon the digital images of the confirmed selected subset.

3. An image-capturing apparatus as recited in claim 1, wherein each digital image in the pre-subset of digital images includes one or more content properties including an absence of shakiness, an absence of redeye, or an image resolution that is greater than a predefined threshold resolution.

4. One or more non-transitory processor-readable storage devices having processor-executable instructions embodied thereon, the processor-executable instructions, when executed by one or more processors, direct the one or more processors to perform operations comprising:
   obtaining a set of digital images; and
   selecting at least one subset of digital images of the set based upon a binary selection filter followed by a weighted selection criteria, the binary selection filter to determine a pre-subset of digital images that is operated on by the weighted selection criteria to determine the selected subset of digital images, wherein the selecting includes at least:
      grouping the set of digital images into an intermediate grouping that includes two or more of the digital images of the set; ranking the digital images of the intermediate grouping based upon multiple weighted criteria;
      designating an allotment of ranked digital images of the intermediate grouping as the selected subset of digital images;
      making the selected subset of digital images accessible by a user;
      attaining feedback from the user regarding user-acceptability of the selected subset of digital images, the attained feedback a user initiated removal of a digital image from the selected subset of digital images; and
      in response to attained user-feedback indicating a lack of user-acceptability of the selected subset of digital images, performing a reweighted selection of at least one updated subset of digital images of the set, the reweighted selection including using at least one or more update of the multiple weighted criteria, the at least one or more update of the multiple weighted criteria having at least one updated weight value compared to at least one weight value associated with the multiple weighted criteria, the at least one update weight value established based on the user initiated removal of a digital image from the selected subset of digital images.

5. One or more non-transitory processor-readable storage devices as recited in claim 4, further comprising: responding upon obtaining the user-feedback regarding the user-acceptability of the selected subset of digital images.

6. One or more non-transitory processor-readable storage devices as recited in claim 4, further comprising clustering the set of digital images into multiple clusters, the selected subset of digital images being selected from one of the multiple clusters.

7. A method comprising:
   obtaining a set of digital images;
   selecting at least one subset of digital images from the set of digital images based upon a binary selection filter followed by a weighted selection criteria, the binary selection filter to select a pre-subset of digital images based at least on one or more of technical metadata, descriptive metadata, or administrative metadata of individual digital images in the set of digital images, the pre-subset of digital images to be operated on by the weighted selection criteria to determine the selected subset of digital images;
   attaining feedback from the user regarding user-acceptability of the selected subset of digital images, the attained feedback being a user initiated removal of a digital image from the selected subset of digital images; and
   in response to attained user-feedback indicating a lack of user-acceptability of the selected subset of digital images, performing a reweighted selection of at least one updated subset of digital images of the set, the reweighted selection including using at least one or more update of the weighted selection criteria, the at least one or more update of the weighted selection criteria having at least one updated weight value compared to at least one weight value associated with the weighted selection criteria, the at least one update weight value established based the user initiated removal of a digital image from the selected subset of digital images.

8. A method as recited in claim 7, wherein the selecting includes:
   segregating the set of digital images into an intermediate grouping based upon whether the digital images match one or more specified criteria;
   ranking the digital images of the segregated intermediate grouping based upon multiple weighted criteria; and
   designating an allotment of similarly ranked digital images of the segregated intermediate grouping as the selected subset of digital images.

9. A method as recited in claim 8, wherein the designated allotment includes digital images that are ranked amongst the segregated intermediate grouping.

10. A method as recited in claim 8, wherein the designated allotment includes digital images that are bottom ranked amongst the segregated intermediate grouping.

11. A method as recited in claim 8, further comprising calculating a cardinality of the designated allotment based upon a percentage of the segregated intermediate grouping.

12. A method as recited in claim 7, wherein the performance of reweighted selection includes:
   adjusting one or more weight values of the weighted criteria;
   updating the subset of digital images of the set by reselecting a collection of digital images from the set based upon the adjusted weighted criteria.

13. A method as recited in claim 7, further comprising, in response to attained user-feedback indicating user-acceptability of the selected subset of digital images, performing one or more defined actions upon the digital images of the confirmed selected subset.

14. A method as recited in claim 13, wherein the defined actions performed on the digital images of the confirmed selected subset is selected from a group consisting of archiving, sharing, and printing.

15. A method as recited in claim 13, wherein the defined actions performed on the digital images of the confirmed selected subset is selected from a group consisting of deleting or recycling.

16. A method as recited in claim 7, wherein the weighted criteria are selected from a group of digital-image properties consisting of image-acquisition location, focus, contrast, shake, red-eye, image content includes a person designated as a favorite of the user, image content includes a person in a list of contacts of the user, photo is tagged, user-added criteria, photo was auto-corrected, photo was post-processed, flash was used, and social-network ranking of a digital image.

17. A method as recited in claim 7, further comprising clustering the set of digital images into multiple clusters, wherein the selected subset of digital images is selected from one or more of the multiple clusters.

18. A method as recited in claim 7, further comprising clustering the subset of digital images into multiple clusters.

19. A method as recited in claim 7, wherein the administrative metadata includes a licensing term, a rights usage term, a specific digital image use restriction, a model release, an identity of an digital image creator, or contact information for a digital image owner.

* * * * *